Figure 1:
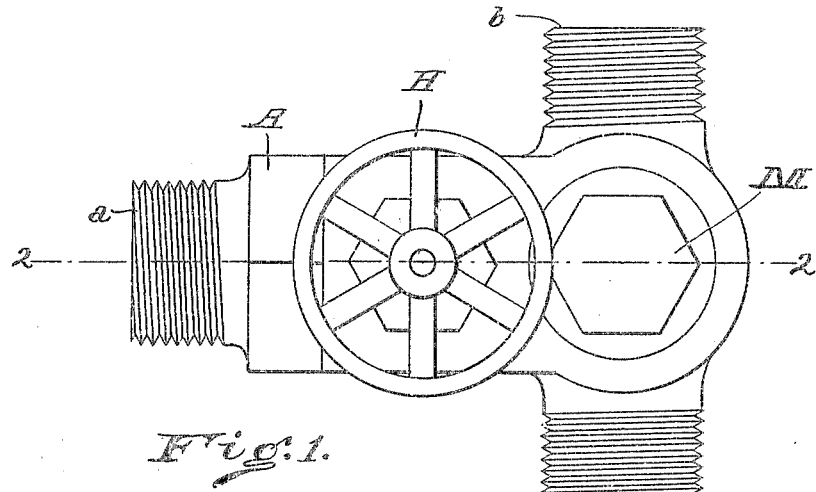

No. 793,769. PATENTED JULY 4, 1905.
J. M. COFFELDER, Jr.
CHECK VALVE FOR LOCOMOTIVES.
APPLICATION FILED APR. 2, 1904. RENEWED APR. 28, 1905.

Witnesses
Leola M. Benedict
J. E. Manley

Inventor
John M. Coffelder Jr.
By H. W. Benedict
Attorney

No. 793,769. Patented July 4, 1905.

UNITED STATES PATENT OFFICE.

JOHN M. COFFELDER, JR., OF ELMWOOD PLACE, OHIO.

CHECK-VALVE FOR LOCOMOTIVES.

SPECIFICATION forming part of Letters Patent No. 793,769, dated July 4, 1905.

Application filed April 2, 1904. Renewed April 28, 1905. Serial No. 257,925.

*To all whom it may concern:*

Be it known that I, JOHN M. COFFELDER, Jr., a citizen of the United States, residing at Elmwood Place, in the county of Hamilton and State of Ohio, have invented a new and useful Article of Manufacture, of which the following is a specification.

My invention relates to check-valves for use on locomotives, in which certain new and practical features are employed; and the objects of my invention are, first, to provide a check-valve for locomotives which may be for either the right or left side thereof; second, to employ such means with a check-valve as will enable the operator to "grind" in the valve without drawing the fire or letting water below the check by using the shut-off, as is necessary by the use of the locomotive check-valve now in use; third, to provide a locomotive check-valve which may be used with hose connection on the opposite side of the check for the purpose of filling a "dead engine" with hot water, and thus avoid the cracking of the fire-box, as is frequently done by using cold water, as is necessary in the present method; fourth, to provide a check-valve and auxiliary parts thereto to enable the operator to repair the valve without delay by the auxiliary means to shut off the water between the boiler and the check-valve; fifth, to provide a check-valve with auxiliary parts thereto, so as to enable the operator to "set" the valve without depending on "jarring" it by a hammer, as is the present method, but simply to shut the water off from the boiler, remove the check-bonnet, take out the check, and remove the obstruction without any delay or imminent danger of breaking the valve-box; sixth, to provide a check-valve with auxiliary parts thereto, so as to enable the operator in event the check becomes inoperative to shut off the auxiliary valve and prevent the steam from flowing back into the water-tank, and thus heating so the opposite injector will not work, as is the present *modus operandi;* seventh, to provide a check-valve and auxiliary parts thereto, so as to prevent the hose used between the engine and water-tank from being damaged or blown off in case the check-valve does not "seat" itself and cannot be gotten down to its proper place or in event it is broken. In case the valve in present use "gets up" and cannot be seated the water in the tank gets hot and prevents the injector on the opposite side from working, and often the water gets so low in the boiler that the fire must be "drawn" and the helpless engine "towed" to the repair-shops, causing much delay and inconvenience and great expense. My invention obviates all of this. It prevents the backflow of water and, further, prevents the loss of water from the boiler and prevents any damage being done to the injector on the opposite side of the engine, and hence saves time, labor, and expense. I attain these objects by the mechanism described in this specification and illustrated by the accompanying drawings, in which—

Figure 2:
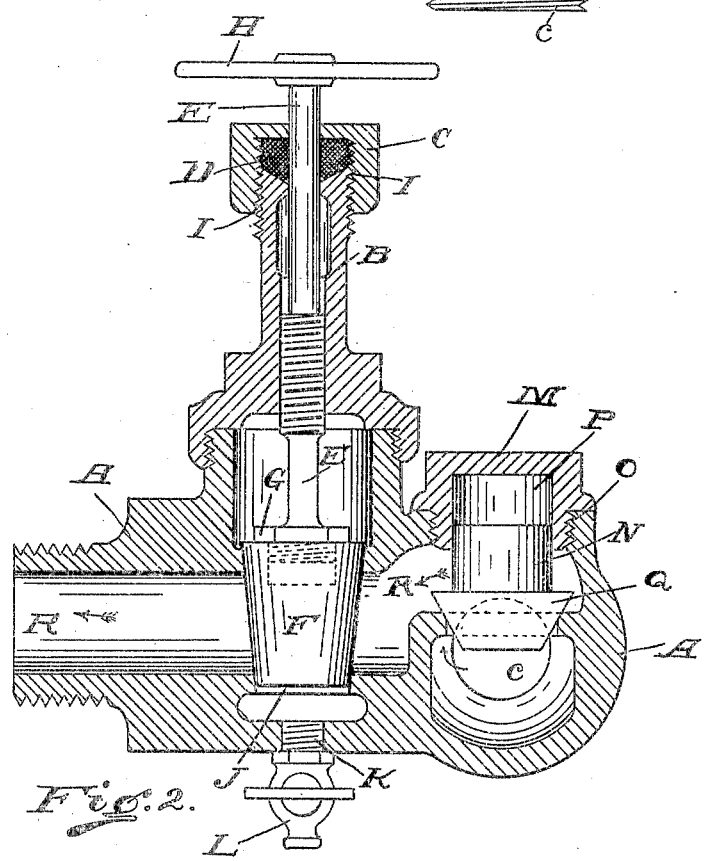

Figure 1 is a top plan view. Fig. 2 is a section view on line 2 2 of Fig. 1.

Similar letters refer to similar parts in both the views.

In Fig. 1 a top plan view of the valve is shown, *a* being the connecting inlet end of the valve-body. *b* and *c*, respectively, show the left-hand and the right-hand connecting ends, indicating how the valve may be used on either side of the engine. By capping *c* and engaging *b* adapts the valve for use on the left side of the locomotive, and by using the same cap, taken from *c*, put onto *b*, adapts the valve for use on the right side of the locomotive. This construction of a check-valve will dispense with the "right" and "left" valves now in use. A is the body of the valve. M is the check-bonnet. H is the valve wheel or handle.

In Fig. 2, A shows the body of the valve. B shows the valve-bonnet. C is the stuffing-nut. D is the packing in the stuffing-nut. E is the valve-stem. F is the valve-disk. G is the disk-nut. H is the valve-stem wheel or handle. I shows the engagement of the screw-threaded stuffing-nut and the threaded stem end of the valve's bonnet. J is the hollow valve-seat, on which the base end of the valve-disk rests. K is a screw-threaded nipple connecting the hollow base J and the petcock L, which petcock serves the purpose of a "drip," and in the event of any ordinary foreign substance preventing the seating of the valve it may be easily removed by opening the cock and allowing water to run out, tending to produce a vacuum at the base of the valve-disk. M is the check-bonnet to the float-disk N. O is the engagement of the screw-threaded points of the check-bonnet M and the body of the valve A. N is a float check-disk. P is the chamber into which the check-disk recedes when forced by the flow of water and lifted from its bearings at Q. R is the water-channel, and the arrows indicate the course the water takes through this channel.

The utility of my invention is at once apparent. In practice $b$ or $c$ is connected to the water-intake. This flow of water is governed by the floating check-disk N. Valve-disk F is always resting, lifted away from its seat, to permit the flow of water through the channel R; but the check-disk being susceptible to interference by small articles of scale or small obstacles is not wholly reliable, nor is it, for these reasons, always positive in its action. The seating of this check-disk is a matter of the greatest mechanical precision. The smallest particle of substance, a minute scale, or speck of sand adhering to the check-disk or to its walls will prevent its perfect operation. In the present method this is a frequent trouble. My invention enables the operator to almost instantly remove the obstacle or to correct the imperfect operation of the check-disk by merely shutting the valve-disk F, which is opened and closed in the ordinary manner of opening and closing such valves. Shutting or closing valve F stops the return flow of water from the boiler. Check-bonnet M is then removed. Check-disk N is cleaned or the obstacle is removed from either the check-disk or its wall-seats. The check-bonnet M is replaced and the usual trouble, loss of time, expense, &c., have been averted.

Having thus fully described my invention, what I claim as new, and desire to secure by Letters Patent, is—

A shut-off valve F, an actuating-stem E thereto a disk-nut G engaging said stem, a stuffing-nut C, thereto and the packing D therein, suitably adjusted in the body A thereof, in combination with a check-disk N, a check-bonnet M thereon, a check-disk chamber P, therefor located in the water-channel R, said water-channel entering at $b$ and $c$ respectively and converging in the valve-body A, and terminating at $a$ substantially as described and for the purpose specified.

In testimony whereof I have signed my name to this specification in the presence of two subscribing witnesses.

J. M. COFFELDER, Jr.

Witnesses:
L. M. BENEDICT,
C. S. SPARKS.